Feb. 11, 1969  P. L. PETERSCHMIDT  3,426,669
METHODS OF AND SYSTEMS FOR TREATING AGRICULTURE PRODUCTS
Filed Oct. 31, 1966  Sheet 4 of 5
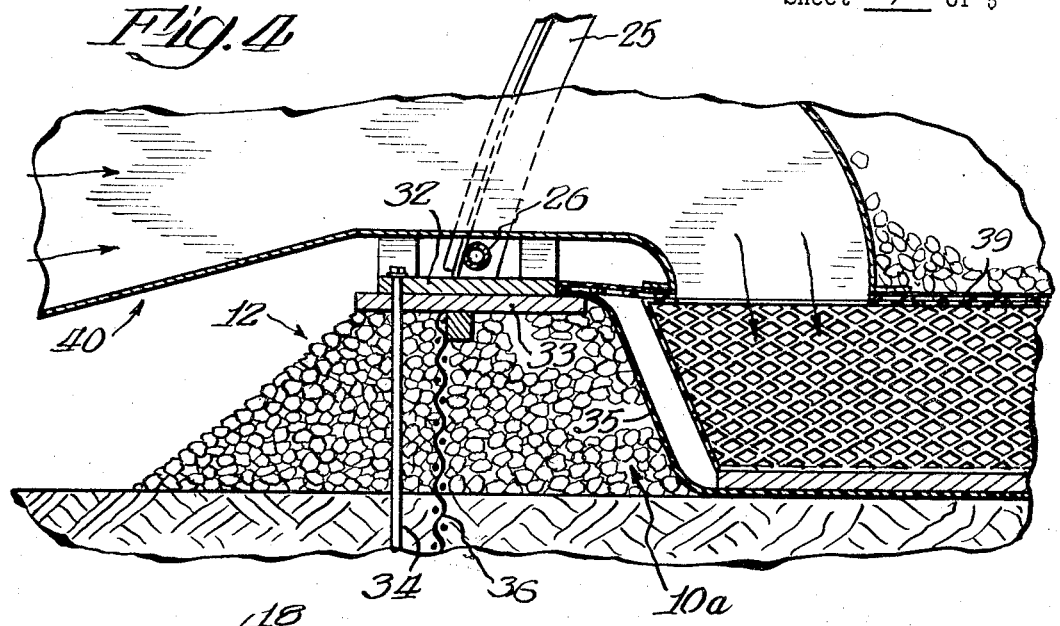
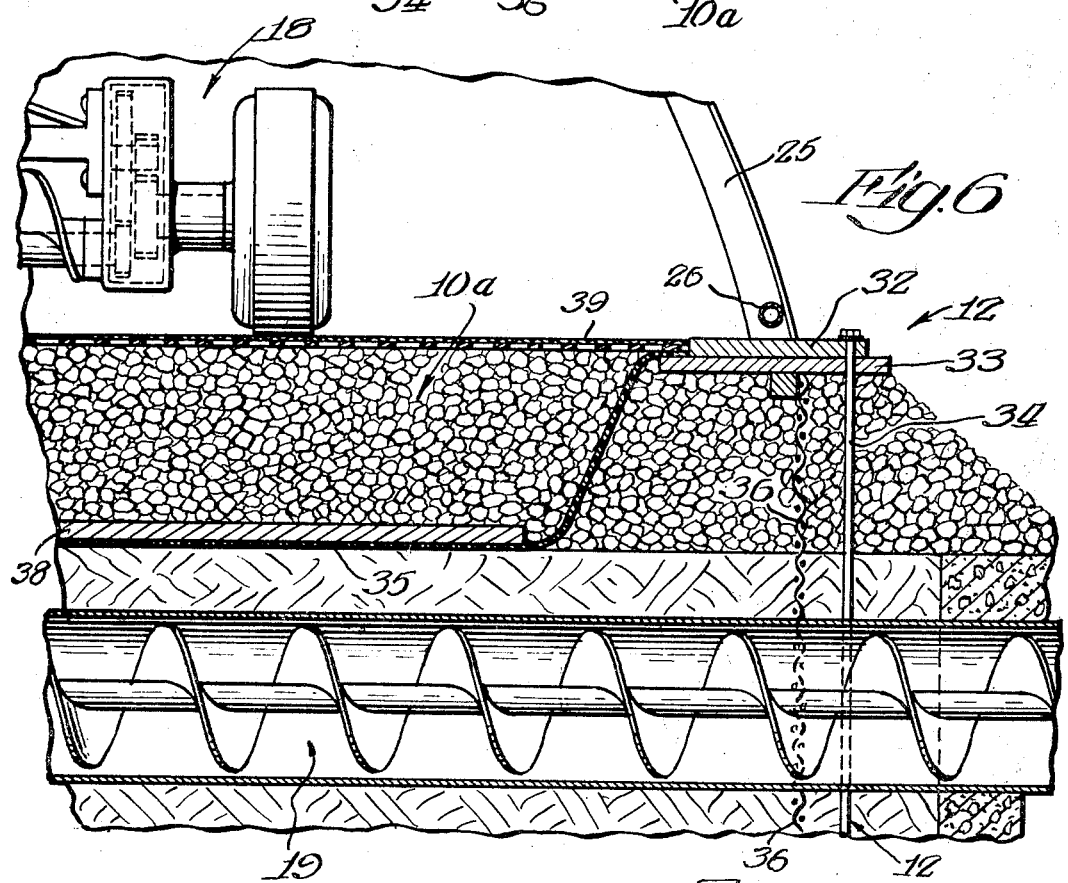
Inventor:
Paul L. Peterschmidt
By Hume, Groen, Clement & Hume Attys

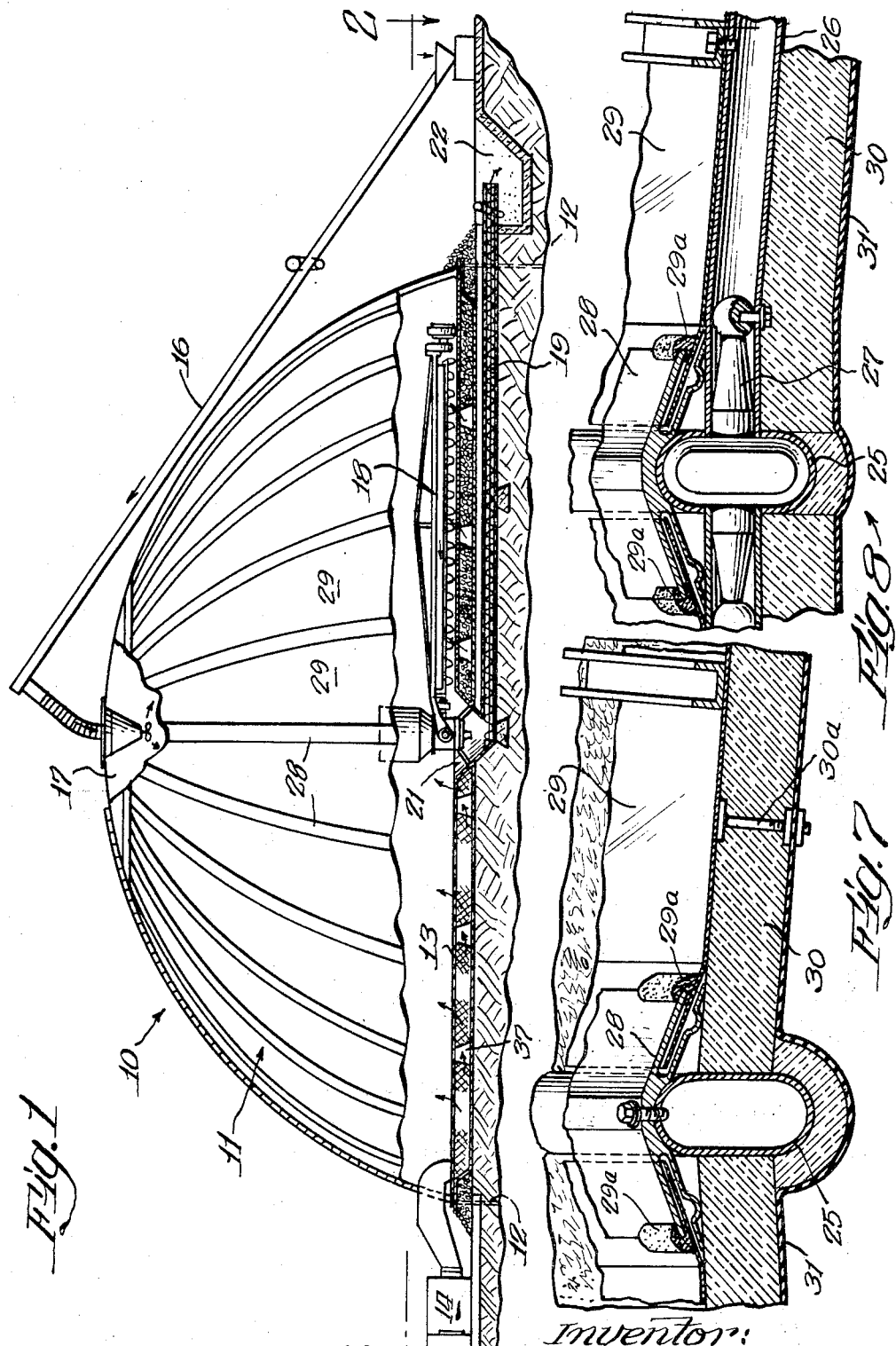

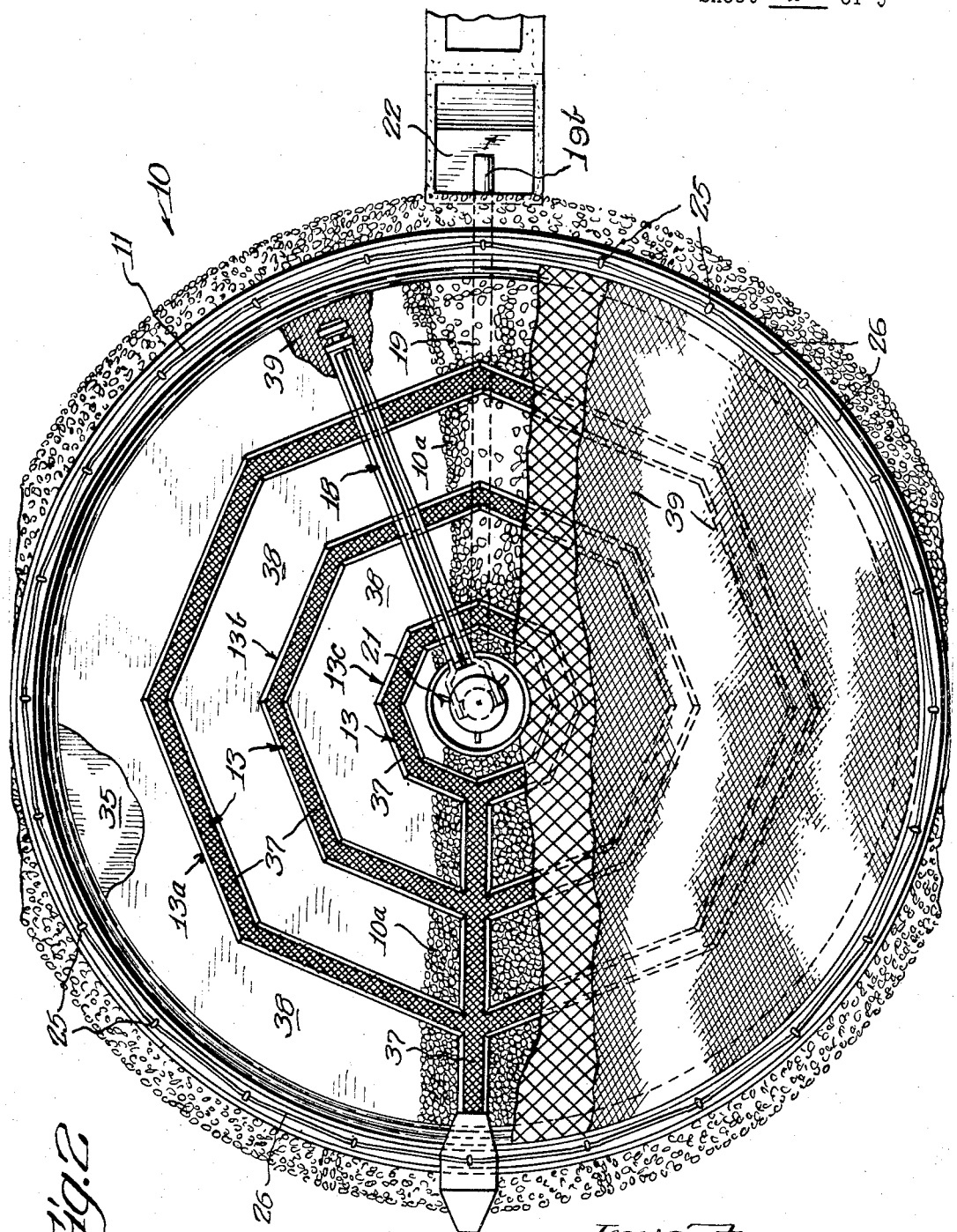

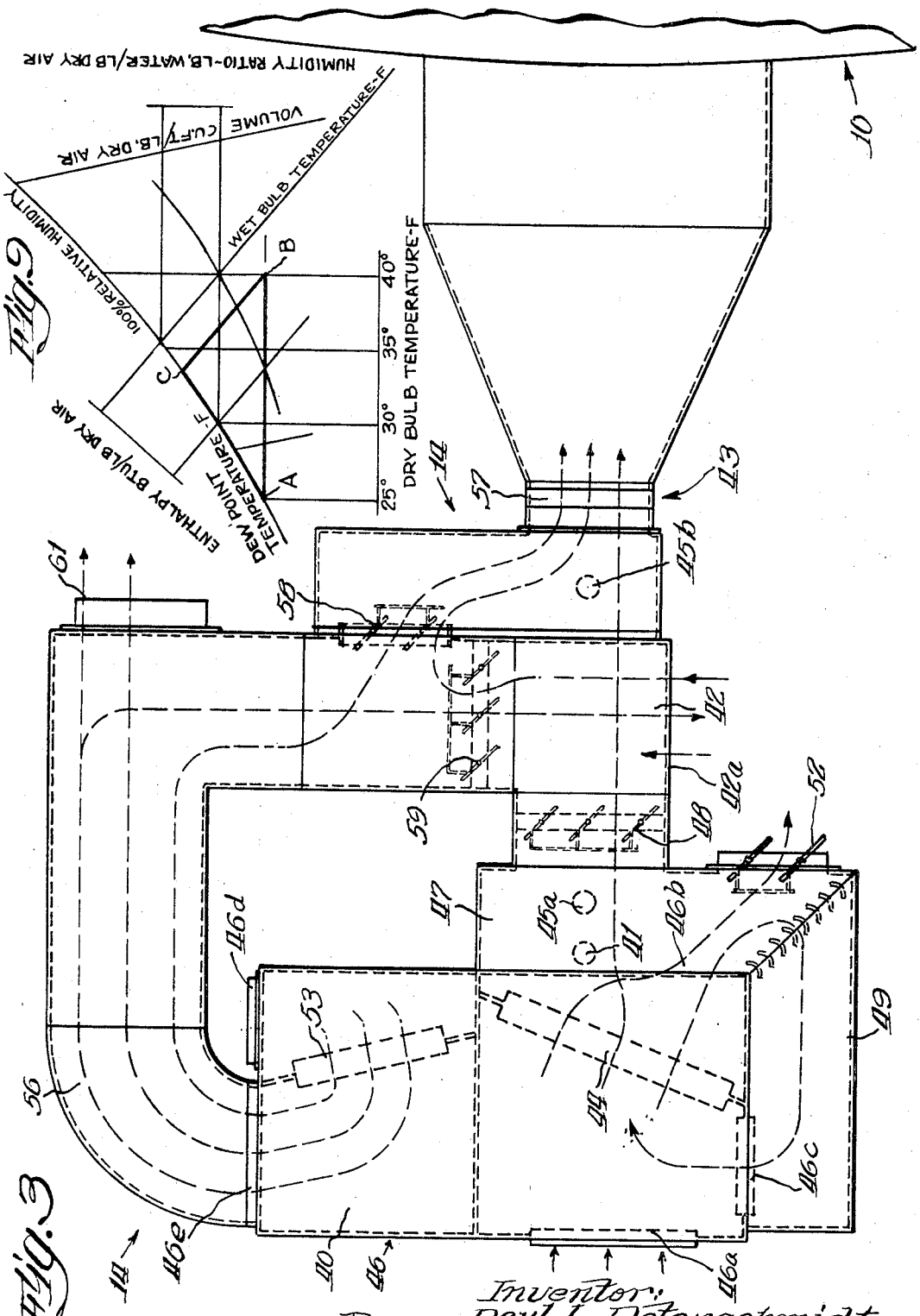

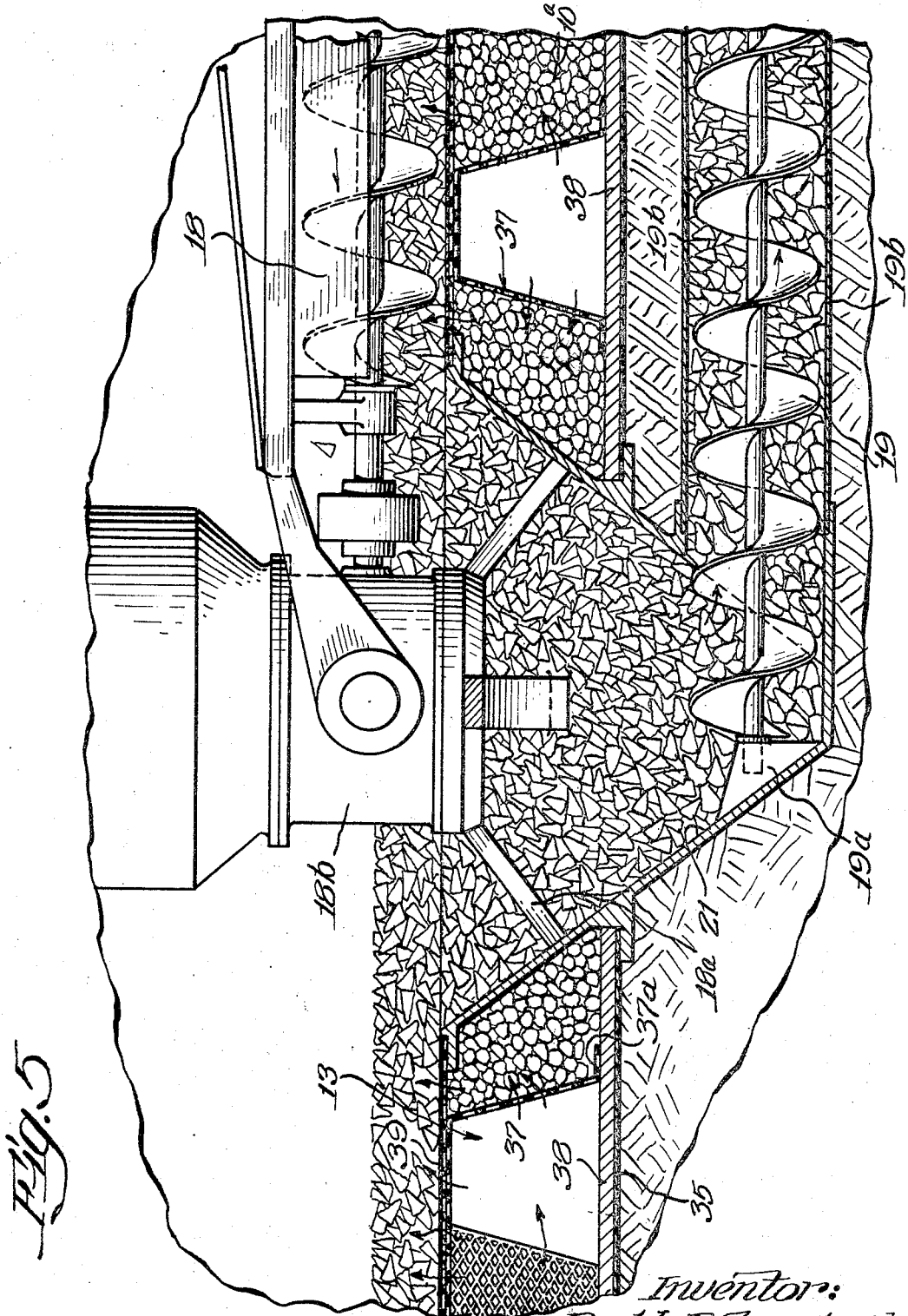

United States Patent Office 3,426,669
Patented Feb. 11, 1969

3,426,669
METHODS OF AND SYSTEMS FOR TREATING AGRICULTURE PRODUCTS
Paul L. Peterschmidt, Deerfield, Ill., assignor to Frigidome Corporation, Peoria, Ill., a corporation of Delaware
Filed Oct. 31, 1966, Ser. No. 590,888
U.S. Cl. 98—55          12 Claims
Int. Cl. E04h 7/22; F26b 7/06, 19/00

ABSTRACT OF THE DISCLOSURE

A system is provided for storing and conditioning agricultural products including an enclosure including means for providing air flow throughout the support base and through agricultural products stored therein, along with transducer means for generating an air flow supply having preselected temperature and relative humidity characteristics. The transducer includes control means for distributing a substantially saturated, chilling air flow through the product to create a uniform keeping temperature and a second control means for distributing an only partially saturated air flow through the product at a temperature which is related to the keeping temperature of the product. In carrying out the process, a substantially saturated chilling air flow is distributed throughout the product to establish the proper keeping temperature at which the product can be stored for prolonged periods without spoilage, and thereafter the moisture content is reduced by distributing a partially saturated air flow throughout the product, the partially saturated air flow having controlled temperature and relative humidity related to the keeping temperature of the product.

---

This invention relates to the storing and/or conditioning of agricultural products and, more particularly, to improved methods of and systems and facilities for effecting the storage and selective conditioning of various agricultural products such as corn, soybeans, wheat, grain sorghum, peanuts, potatoes, and the like.

It is an object of the present invention to provide improved methods of storing and conditioning agricultural products.

Still another object of the present invention is to provide improved systems and facilities for effecting the storing and conditioning of agricultural products such as corn, soybeans and the like.

A further object of the present invention is to provide methods of and systems for treating agricultural products so as to facilitate the storage thereof for relatively long periods of time and/or in anticipation of the selective conditioning of the product for market use.

An additional object of the present invention is to provide improved systems and facilities for effecting the storage of agricultural products and/or the conditioning of such products for market use, which systems and facilities are both reliable and economical in operation and sufficiently versatile so as to be capable of handling a variety of products in various environmental surroundings.

Other objects and advantages of the present invention will become apparent from the following detailed description of one preferred embodiment thereof particularly when considered in conjunction with the accompanying drawings wherein:

FIGURE 1 is an elevational view depicting a preferred embodiment of a storage and conditioning facility embodying the features of the present invention, portions of the structure being broken away to illustrate various subcomponents of the facility;

FIGURE 2 is a cross-sectional view taken generally along the line 2—2 in FIGURE 1;

FIGURE 3 is an enlarged cross-sectional view of a transducer unit which produces controlled environmental conditions within the facility shown in FIGURE 1;

FIGURE 4 is an enlarged fragmentary view depicting various detailed structural features of the facility as shown in FIGURES 1 and 2;

FIGURE 5 is a view similar to FIGURE 4 but illustrating still other structural and functional features of the facility;

FIGURE 6 is another view similar to FIGURES 4 and 5 and which depicts other structural features of the storage and conditioning facility of the present invention;

FIGURE 7 is an enlarged fragmentary cross-sectional view illustrating various structural features of the storage unit employed in the facility of the present invention;

FIGURE 8 is a view generally similar to FIGURE 7, but depicting other structural features of the storage unit; and FIGURE 9 illustrates a portion of a psychrometric chart which graphically illustrates a phase of the cyclic operation contemplated by the present invention.

Referring generally to the drawings, the present invention is directed to the storage and/or conditioning of agricultural products. Although suitable for treating various agricultural products, a full appreciation of the present invention will be enhanced if particular reference is hereinafter made to its use in connection with the storage and conditioning of high-moisture content shelled corn. In this connection, high-moisture content shelled corn, like other agricultural products, is susceptible to deterioration and spoilage if the corn is stored for prolonged periods. As discussed in the booklet "Drying Shelled Corn" (Circular 916—published by the University of Illinois in September of 1965), the allowable storage time for moist grain varies in accordance with both its moisture content and temperature. Heretofore, in an attempt to increase the storage life of grain products, emphasis has been placed on drying corn by a variety of techniques. The aforementioned circular discusses various of the basic systems previously employed to provide a solution to the problems incident to the storage of high moisture grain.

In contradistinction to the techniques previously employed to prolong the storage life and/or to condition agricultural products such as corn for optimum market acceptance, the present invention contemplates the chilling of the product and the storage of the product under controlled ambient conditions. As an incident to and following such preconditioning of the product for purposes of storage, the automatic and accurately controlled reduction in the moisture content of the product is effected as it is held at relatively low "keeping" temperature.

The system and facility of the present invention includes means for inloading the agricultural product to a suitably insulated enclosure or dome structure corresponding to that disclosed and claimed in the co-pending application of the inventor herein, Ser. No. 408,145 that was filed on Nov. 2, 1964. Because of the novel structural and geometrical characterists of the dome structure (i.e. which complement the angle of repose of the stored product), a maximum quantity of product is distributed over a base of relatively large cross-sectional area and the structural loads exerted against the walls of the storage enclosure are minimized. At the same time, the depth of the stored product is minimized thereby enhancing the effectiveness of the conditioning air flow that is distributed therethrough, as hereinafter more fully described. The base structure on which the inloaded product is supported is preferably formed with a suitable ducting network such that the inflowing conditioning air is substantially uniformly distributed into and through the product. In this latter connection, an external automatically controlled air distributing and conditioning transducer is selectively employed to effect the production of conditioning air and to supply a controlled air flow to the facility and through the stored product.

In accordance with the invention, the agricultural product to be stored or treated (e.g. shelled corn) is preferably supplied to the dome-like storage facility immediately after harvesting, irrespective of the moisture content and/or temperature of the product. Thus, field shelled corn having a 30% moisture content and a temperature of 70–80° F. is suitable for direct inloading into the storage facility of the present invention without risk of spoilage. As such inloading occurs, the external, air distributing and conditioning transducer is rendered effective to supply a controlled air flow to the inloaded product so as to immediately reduce the temperature of the product to a preselected temperature that will afford ample time for the storage and/or conditioning of the inloaded product. Thus, at the conclusion of the inloading operation and as the distributed air flow continues to circulate through the inloaded product, the temperature of the product will approach a "keeping" temperature so that prolonged storage of the product can be achieved.

More specifically and in response to establishing a "keeping" temperature throughout the volume of the accumulated product, several alternatives are available. For example, the product, because of its substantially uniform keeping temperature, can be stored for a relatively long period of time (e.g. for "on farm" use). Alternatively and if it is desired to supply the product for market use, a conditioning cycle is initiated. The conditioning cycle corresponds generally to the treatment of the product during inloading, but differs in that the primary object of the conditioning cycle is to reduce the moisture content of the product to a level consistent with maximum market demand and with optimum market quality. In accordance with the invention, this is effected without exposing the product to risk of spoilage or deterioration and without substantial dry matter loss. Upon the conclusion of the conditioning cycle, the stored product is outloaded by use of suitable means that form an integral part of the facility.

Referring more specifically to FIGURE 1, a storage facility 10 is shown as supported on the surface of the ground with a dome-like structure or enclosure 11 defining a storage area for the product (e.g. high-moisture content shelled corn). The dome-like structure 11 is preferably secured in place by an anchoring arrangement 12, as shown in FIGURES 4 and 6. As hereinafter more fully described, the base or bed layer 10a of the enclosed storage area is comprised of a quantity of crushed rock or gravel that is distributed directly over the ground surface beneath the dome structure. A suitable ducting arrangement 13 (FIGURE 2) is distributed throughout the base layer of the facility so as to accommodate the distribution of a controlled air flow to and through the stored product from a selectively operable air distributing and conditioning transducer 14.

The product (e.g. shelled corn) to be stored and/or conditioned is preferably supplied to the storage enclosure defined by the dome 11 by means of a conventional conveying means 16 (e.g. one or more conveyors of the type sold under the trademark "Belt Veyor") and is distributed over the base layer 10a by a conventional form of radial distributor or spreader 17 that is mounted in the dome cap. The facility 10 is also provided with means for selectively discharging the stored product from the facility 10 in the form of a conventional sweep auger 18 and a fixed outloading auger 19 that extends from a centrally located discharge pit or channel 21 to an outloading station 22 external of the facility.

In considering the structural characteristics of the dome 11 and the means 12 by which the dome is mounted in place, it should be understood that the disclosed embodiment is merely exemplary of the type of storage and conditioning facility contemplated by the present invention. Accordingly and although the disclosed structure yields a desirable compromise between economies of construction and the capability of versatile and reliable operation, other structures might be satisfactorily employed with the transducer 14 to achieve the benefits of the present invention.

As generally described above, the dome 10 preferably corresponds to the structure disclosed in the aforementioned co-pending application Serial Number 408,145. That is, the dome 11 is preferably a modular, self-supporting curvilinear structure formed by a fully loaded bearing, curvilinear framework. As further described in the application, Serial Number 408,145, the framework is formed by a plurality of tubular compression members or meridian segments 25 having a first cross-sectional configuration and dimension (FIGURES 7 and 8). In addition, the dome structure 11 includes a plurality of tubular reinforcing members 26 that are joined to form a plurality of spaced, lateral ring segments extending around the entire dome. The reinforcing members and compression members are joined together by a plurality of joint elements 27 similar to those disclosed and claimed in United States Patent No. 3,155,405. A plurality of mullion strips or panel receiving guides 28 are joined to the compression members or meridian segments of the framework so as to accommodate the reception of preformed panel members 29 that are slid in place within the panel supporting guides or mullions.

The major structural distinction between the dome-like enclosure disclosed and claimed in the aforementioned co-pending application and the dome structure 11 employed in the facility of the present invention resides in the provision of vapor barriers on the internal as well as external surfaces of dome 11. As shown in FIGURES 7 and 8, the internal vapor barrier is formed by an internal layer 30 of fiber glass or similar insulation that is joined to the interior of the panel members 29 by suitable fasteners 30a. The layer 30 surrounds the entire internal framework of the dome including the compression members 25. This insulating layer is further supplemented by a moisture impervious sheet 31 which is joined to and extends across the entire inner surface of the layer 30, the sheet 31 being formed of polyethylene or the like. The external vapor barrier is achieved by utilizing layers 29a of a moisture impervious sealant at the merger points of the panel members 29 with the guides 28, as shown.

Referring to the anchoring arrangement 12 as shown particularly in FIGURES 4 and 5, the lower extremities of the dome framework (e.g. the compression members 25) are secured in place through the use of aluminum base plates 32 which are joined in a conventional manner (e.g. by welding or the like) to the bottom surface of each of the compression members. The base plates 32 are in turn supported on complementary plywood or similar panel members 33 that also extend around the entire peripheral edge of the porous base layer on which the dome 10 is supported. Preferably, the panel members 33 are supported on the outermost edge of the base layer 10a, and the entire footing assembly formed by the members 32 and 33 is maintained in place through the utilization of a plurality of screw anchors 34. The screw anchors 34 are joined to these members in a conventional manner and are firmly embedded in the ground surface on which the facility 10 is supported.

As with the interior and exterior surfaces of the dome 11, a vapor barrier is also provided along the ground surface on which the dome is supported. The ground surface vapor barrier which is contiguous with the vapor barrier formed on the internal surface of the dome, is preferably formed by a large circular polyethylene sheet or membrane 35. The sheet 35 is disposed directly on the cleared and leveled ground surface that forms the site for the facility 10. To insure continuity of the two vapor barriers, the peripheral edge portion of the sheet extends upwardly from the base layer 10a and is confined between the base plates 32 and support members 33 (i.e. see FIGURES 4 and 6).

Referring now to FIGURES 2 and 5, the air circulating ducting arrangement 13 is selectively formed on the upper surface of the sheet or membrane 35, and this ducting network is preferably placed in position prior to the formation of the crushed rock and/or gravel base layer 10a. That is, after the ducting arrangement 13 is suitably formed and distributed across the surface of the membrane 35, a supply of gravel or crushed rock is distributed over this entire region to form a base layer that is pervious to the air flow emanating from the ducts. At the perimeter of the dome base and external of the anchored, upwardly extending peripheral edge of the sheet 35, the crushed rock layer is continued to support the anchoring structure for the dome. As shown in FIGURES 4 and 6, a vertically extending generally cylindrical screen member 36 is suitably secured to the members 33 and extends through and around the edge of the base layer at this location so as to form a further obstruction to the ingress of rodents or the like to the facility 10.

Referring now to the ducting arrangement 13, this air flow distributing means is preferably formed by a plurality of individual duct members 37 that are fabricated from commercially available expanded metal or a similar heavy duty screen-like material. The individual ducts 37 preferably have an inverted, generally U-shaped configuration with the outwardly flanged lower extremities 37a thereof (FIGURE 5) being nailed or otherwise suitably secured to base plates 38 which, as with the panel members 33, are formed of plywood or the like. The base plates 38, to which the ducts 37 are secured, facilitate both the positioning of the individual ducts and the joining thereof to form the continuous air flow distribution network 13. In this connection, the ducts 37 are laid out and joined as shown in FIGURE 2 so that the air flow supplied to the ducting arrangement 13 from the transducer 14 is distributed about a plurality of concentric air flow paths 13b, 13c, and 13d. Preferably, the individual duct segments 37 are joined together in continuous fashion by welding or the like so that each of the concentric air flow paths communicates directly with the main inflow duct 13a which is coupled directly to the output of the transducer.

After the crushed rock is properly distributed to form the porous base layer 10a, a porous screening member 39 is placed on top of the base layer. Preferably, the screening member 39 is comprised of a lower load supporting element in the form of expanded metal and an upper element of fiber glass screening. This screening member does not inhibit the air flow passage to and through the stored product but does insure that the inloaded product is not dispersed into the base layer. Accordingly, as the aforedescribed cooling and product conditioning operations are effected in response to the actuation of the transducer 14, the controlled and conditioned air flow supplied to the ducting arrangement 13 percolates through the product. As the air flow emanates from the product pile, it is either passed out of the dome cap through a conventional unidirectional ventilating port surrounding the spreader 17 or is returned to the intake of the transducer when operating in a closed system mode.

As generally outlined above, the remaining major structural and operational components of the facility 10 include the sweep auger 18 which communicates with the central discharge channel 21 (FIGURE 5). Although the discharge channel 21 can be constructed in a variety of ways, it is preferable that this funnel-like structure be a preformed concrete member that is situated in a suitably proportioned apertured portion of the base layer 10a and supported in an excavated segment of the ground surface that communicates with the discharge auger 19. The mounting means 18a for a conventional sweep auger drive motor is preferably secured to the channel 21 in a manner such that the gravity discharge of the stored product through the channel is not obstructed.

As shown, the discharge auger 19 communicates directly with the lower extremity of the channel 21 and the free end of the discharge auger is mounted within a conventional support and bearing structure 19a that is secured to one segment of the funnel-like wall structure of the channel. A reinforced tubular housing 19b preferably serves as the confining enclosure for the discharge auger 19. That is, the housing 19b extends through the ground beneath the base layer 10a so as to communicate with the outloading station 22 (FIGURE 1). It will be appreciated that the operation of those components of the facility when discharging the stored product is such that the product is allowed to freely pass (i.e. under the influence of gravity) into the discharge channel 21 from whence it is dispersed by action of the discharge auger 19 to the outloading station 22. When gravity discharge of the product is no longer effective, the sweep auger 18, in a conventional manner, is rendered operable to remove the remaining product from the enclosure and supply it to the discharge auger 19.

Referring now to FIGURE 3 and as broadly outlined above, the operation of the facility 10 is selectively and automatically controlled by the air distributing and conditioning transducer generally designated by the numeral 14. Preferably, the transducer 14 includes a heat pump 40, a heat exchanger 42, an air circulating blower 43, as well as suitable ducting means and a plurality of selectively actuable dampers that coact to produce an airflow supply of controlled characteristics irrespective of ambient conditions. The transducer system 14 also preferably includes a plurality of conventional temperature responsive sensor elements 41, 45a, and 45b. These sensor elements are disposed within the airflow stream at preselected locations such that the air flow temperature characteristics are continuously monitored. The output of each of the sensors 41, 45a, and 45b is used to selectively actuate one or more conventional damper positioning drive motors (not shown). The sensors 41, 45a, and 45b are preferably microtherm relay units (e.g. of the type manufactured by Barber-Coleman Company) that are connected in circuit with the damper positioning motors so as to effect the operation thereof in accordance with sensed temperature conditions. An additional external sensor is also preferably employed to either automatically shut down the transducer 14 or initiate closed cycle operation of the system when the ambient temperature drops below a preselected minimum temperature value (e.g. approximately 20° F.).

Preferably, the heat pump 40 is a commercially available type (e.g. such as that being marketed by the Airtemp Division of Chrysler Corporation), with the capacity and operating characteristics thereof being dictated in accordance with the size and product load of the facility 10. In this connection, the diagrammatically depicted heat pump includes a cold or outdoor coil 44 to which air is supplied through a louvered or baffled section 46a of the heat pump housing 46. A suitable fan (not shown) is employed to effect the circulation of air from outside the heat pump housing 46 and across the outdoor or cold coil 44. Obviously, the circulation through the heat pump is supplemented by the action of the blower 43.

Air passing across the outdoor coil 44 flows through still another baffled or louvered section 46b of the housing and into a first air flow duct 47. As shown, the air flow duct 47 communicates through a selectively actuable damper 48 with the heat exchanger 42. Similarly, duct 47 communicates with a second air flow duct 49. The duct 49 provides a return path through a louvered or baffled section 46c of the housing so as to accommodate the recirculation of air across the outdoor coil. A selectively actuable damper 52 is located adjacent the point of merger of the ducts 47 and 49 and, when open, provides for the discharge of at least a portion of the cold coil air flow to atmosphere.

The housing 46 also provides the enclosure for an indoor or hot coil 53. In this connection, a baffled or louvered section 46d of the housing 46 accommodates the intake of ambient air that is passed across the indoor or hot coil 53. Air passing over the coil 53 is discharged through another louvered or baffled housing section 46e under the influence of a suitable blower (not shown) that is associated with the indoor section of the input end of a third air flow duct 56 which communicates with the blower housing 57 by means of a selectively actuable damper 58. In addition, the output of the duct 56 is coupled to the heat exchanger 42 by means of a damper 59 and directly to the atmosphere through a third damper 61. Preferably, the heat exchanger 42 is a conventional crossflow heat exchanger that is constructed and arranged in the transducer system so that an outer side wall segment 42a thereof communicates directly with the atmosphere and, in accordance with the operational mode of the transducer, facilitates either the intake or discharge of air.

An appreciation of the advantages of the present invention will be further enhanced if consideration is given to a complete operating cycle including both the inloading and conditioning phase of such an operating cycle. In this connection, the heat pump 40 and its associated control instrumentalities are rendered effective concomitantly with the inloading of an agricultural product (e.g. shelled corn) to the dome 10 as a result of the cooperative action between the conveyor 16 and the spreader or distributor 17. When initially rendered effective, the auxiliary blower 43 and the fan associated with the outdoor or cold coil 44 of the heat pump coact to draw ambient air through the baffled section 46a of the housing 46. If the ambient temperature is in excess of approximately 30–35° F., the damper 52 is closed under the influence of both the inload sensor 41 and the motor driven damper actuating linkage (not shown) associated therewith.

In this connection, the air flow supplied through the channel network 13 on inloading preferably has a wet bulb temperature of approximately 35° F. so that the inloaded product is promptly chilled as it is distributed across the base layer 10a of the storage enclosure 11. To insure that the air flow has the desired temperature characteristics during inloading, the inload sensor 41 selectively actuates the damper 40 so that the incoming ambient air flow (or a portion thereof) is circulated either directly to the network 13 or is recirculated one or more times through the ducts 47 and 49 and across the coil 44. As the desired temperature range is achieved, the damper structure 48 is fully opened to insure maximum unobstructed air flow from the heat pump 40, through the heat exchanger 42 and into the air flow distributing network 13 (i.e. to the inlet duct 13a). The 35° F. air is thus distributed through the network 13 (i.e. about the concentric ducting networks 13b, 13c, and 13d) and percolates through the gravel or crushed rock base layer 10a. As this air flow passes through the screen-like member 27 and the product supported thereon, it effects a reduction in the temperature of this product, preferably to a "keeping" temperature of approximately 35° F.

The inloading or initial chilling phase of a complete transducer cycle continues as the product is delivered to the enclosure 11. It will be appreciated by those skilled in the art that, for example, as warmer corn is delivered to the enclosure and is subjected to the distributed cooling air flow, an amount of evaporation accompanies the chilling of the product so that, incident to the initial chilling cycle, a certain amount of moisture removal also occurs. More moisture is removed from inloaded corn having a higher temperature than corn which is inloaded at a temperature of, for example, 35–50° F. In any event, when the desired "keeping" temperature has been established throughout the accumulated product, a plurality of thermocouple elements, which are selectively located at various discrete positions within the product pile, will indicate this condition.

In this latter connection, the facility 10 can be adapted with various sophisticated control systems for detecting "in pile" conditions. However, such control systems do not constitute an integral part of the present invention, and those skilled in the art appreciate that the ultimate use to which the facility is to be put will dictate whether an elaborate "in pile" sensing control system will be utilized or whether reliance will be placed on operator experience and more conventional condition sensing techniques.

After the desired "keeping" temperature has been established throughout the accumulated product and assuming that a conditioning cycle is to be initiated, the transducer system 14 is shifted into a conditioning mode whereby the conditioning sensors 45a and 45b thereafter effect control over the motor driven dampers. Whereas the heat pump 40 operated to produce a substantially saturated air flow output having a wet bulb temperature of approximately 35° F. during the aforedescribed inloading cycle, this air flow output has a somewhat lower wet bulb temperature during the conditioning cycle. Accordingly, the conditioning sensor 45a at the output of the heat pump is set to resopnd to an air flow having a wet bulb temperature of approximately 25° F., and, in response to such a condition, causes the damper 48 to be fully opened to allow this air flow to pass through the heat exchanger 42. The conditioning sensor 45b at the output of the heat exchanger is responsive to an air flow dry bulb temperature of approximately 40° F. so that the output of the hot or indoor coil 53 of the heat pump and/ or an influx of ambient air is relied upon to yield a somewhat higher temperature and only partially saturated air flow to the network 13 (i.e. the wet bulb temperature of the partially saturated conditioning air flow being approximately 35° F.).

During the drying phase and as this partially saturated air flow passes through the previously chilled product, the wet bulb temperature of the conditioning air flow, which corresponds closely to the keeping temperature of the product, remains substantially unchanged. However, the dry bulb temperature drops as moisture evaporates and the relative humidity of the conditioning air increases. If the product is sufficiently wet so as to saturate the conditioning air flow, the dry bulb temperature drops to the wet bulb temperature (i.e. approximately 35° F.) and the moist, yet "undried" product is maintained at the wet bulb temperature. However, a drying zone is established in the accumulated product and this drying corresponds closely to the depth through which the aforedescribed drop in temperature occurs. More specifically and as the conditioning or "drying" cycle continues, the temperature and moisture content of the product beneath the drying zone approaches the dry bulb temperature of the entering air flow (e.g. at approximately 40° F) and a condition of moisture content equilibrium is established. However, the temperature of the product above the drying zone remains substantially at the wet bulb temperature of the air flow (e.g. at approximately 35° F.), and no reduction in moisture takes place because the conditioning air flow is essentially saturated upon leaving the drying zone. Because saturation of the air flow takes place at very nearly a constant wet bulb temperature, it is possible to maintain a low undried product temperature during the drying or conditioning cycle by supplying an air flow having a low wet bulb temperature, preferably corresponding to the previously established keeping temperature.

Considering the drying phase in relation to a segment of the well-known psychometric chart (i.e. see FIGURE 9) air leaving the heat pump 40 at a wet bulb temperature of approximately 25° F. is heated on passage through the heat exchanger 42 to a temperature of approximately 40° F. (i.e. phase A–B). (Depending on ambient air conditions, this temperautre increase is effected as a result of the actuation of one or more of the dampers 58, 59, and 61.) Accordingly, this partially saturated conditioning air (i.e. having a wet bulb temperature of approximately 35° F.) has the capability of absorbing moisture when passed through the stored product, and the air becomes saturated at a constant wet bulb temperature (i.e. phase B–C).

Although the facility of the present invention is preferably operated as an open cycle system, it may be desirable to operate the facility as a closed cycle system when ambient temperature conditions consistently exceed approximately 60° F. or are consistently less than approximately 20° F. When operated as a closed cycle system, the saturated air, when recirculated through the system, has the moisture extracted from the air flow by lowering its wet bulb temperature as the air is passed over the cold or outdoor coil (i.e. phase C–A).

Referring more specifically to FIGURE 3, the operational mode of the transducer system 14 during a drying cycle depends in substantial part on ambient temperature conditions. Thus if the ambient temperature is such that air emanating from the cold coil 44 must be recirculated to achieve the selected 25° F. wet bulb temperature, the conditioning sensor 45a responds to selectively actuate the damper structures 48 and 58 to accomplish this recirculation.

As the flow of conditioning air at approximately 25° F. enters the heat exchanger 42, the temperature of the conditioning air flow is raised as outlined above through the action of the heat exchanger and, preferably, in conjunction with the output of the hot or indoor coil 53 of the heat pump 40. Accordingly, ambient air that is circulated across the hot coil 53 after entering the housing 46 through the louvered section 46d is typically supplied through the ducting network 56 to the heat exchanger. However, under certain ambient conditions it may be desirable to draw ambient air through the louvered section 42a of the heat exchanger 42, the damper structure 59, and through the damper structure 58 directly into the ducting network 13 along with the output from the cold coil of the heat pump. Alternatively, ambient and other system conditions may dictate that the output from the hot or indoor coil of the heat pump, or at least a portion thereof, be supplied directly to the ducting network 13 through the damper 58 so as to by-pass the heat exchanger. Since the sensors 45a and 45b are employed in the transducer system 14 in conjunction with damper motor controls, the versatility of the facility is such to provide for effective and reliable product treatment irrespective of ambient conditions.

Considering the overall cooling and conditioning cycles in greater detail, the transducer 14 is rendered effective as the product is loaded into the dome-like enclosure 11. Assuring that the enclosure is capable of handling approximately 50,000 bushels of product at an inloading rate of approximately 8,000 bushels per day, the transducer is selectively operated to provide an air flow rate of approximately .5 c.f.m. per bushel. Further, assuming that the product is shelled corn or a similar agricultural grain product having a temperature of approximately 80° F. and a moisture content of 30%, the air flow output from the transducer is preferably saturated air at a temperature of approximately 40° F. Operating the system on a 24 hour basis (i.e. preferably under automatic controls), the desired "keeping" temperature for the product can be achieved within twenty-four hours after the enclosure has been loaded. To achieve such a controlled air flow rate it may be desirable to employ more than one transducer arrangement; however, ambient conditions, the B.t.u. output of the heat pump, and the circulating capacity of the blower will dictate this decision.

Incident to the establishment of a "keeping" temperature during the inloading phase, evaporation of moisture also occurs as the chilling air flow is directed through and across the warmer inloaded product. Thus, an amount of moisture is removed from the product so that, as the temperature is reduced from approximately 80° F. at inloading to a "keeping" temperature of approximately 35° F., the moisture content is similarly reduced from approximately 30% to approximately 27–29%. In the absence of this chilling phase, shelled corn at 80° F. and having a moisture content of approximately 30% cannot be stored for more than 2–4 days. However, as a result of the establishment of a "keeping" temperature throughout the inloaded product, the shelled corn can be maintained within the enclosure 11 for a prolonged period and either for "on farm" use or in anticipation of further conditioning of the product to achieve optimum market acceptability.

In this latter connection, the conditioning of the shelled corn or similar product is initiated after the desired keeping temperature has been established within the enclosure. To this end, essentially the same air flow rate (i.e. approximately .5 c.f.m. per bushel) is maintained. However, the conditioning air delivered to and transmitted through the accumulated product is not saturated upon entry into the enclosure 11 through the ducting network 13. Since it is not saturated, the distribution of the conditioning air at a dry bulb temperature of approximately 40° F. results in the absorption of moisture as the air becomes saturated at a substantially constant wet bulb temperature (i.e. that corresponding to the previously established "keeping" temperature). Thus, an absorption of moisture from the stored product occurs and a drying zone is created; this drying zone progresses from the lowermost layer of the accumulated product and advances upwardly until the desired conditioning (i.e. moisture removal) process is concluded. By maintaining the conditioning cycle under properly controlled conditions and in the absence of totally unanticipated environmental weather changes, the entire quantity of the accumulated product can be suitably conditioned within a predictable number of weeks.

During the conditioning phase, a substantially constant wet bulb temperature of approximately 35° F. is maintained throughout the undried product and the moisture content of the conditioned product is reduced to approximately 15–20%. In the event that system operation dictates that the moisture content is not at equilibrium throughout the entire accumulated product (i.e. the lowermost layer of the product experiences somewhat greater moisture extraction), air at approximately 70° F. and with a moisture content of approximately 40% is circulated through the product to effect the creation of the desired moisture content equilibrium condition. As previously stated, the system can be operated on a closed cycle basis requiring the reconditioning of the air in the heat pump after it is returned from the enclosure through a suitable ducting network (not shown) and prior to its recirculation to and through the product.

Because the curvilinear structural configuration of the dome structure complements the angle of repose of the product confined therein, minimal stress is exerted on the walls of the dome. Moreover, because of the large base area (i.e. approximately 4,000 square feet in a dome capable of handling 50,000 bushels) on which the accumulated product is supported within the enclosure, a maximum quantity of product is stored at a relatively shallow depth (i.e. an average depth of approximately 14 feet). This further enhances the overall efficiency of the system both during the chilling and conditioning cycles of operation.

Because of the continuous lower, inner and outer vapor barriers provided by the enclosure, the amount of condensate developed therein (i.e. due to changes in temperature and variations in humidity) is minimized. To the extent that any such condensate tends to develop within the enclosure, suitable infrared lamps or the like (not shown) can be readily employed to eliminate such condensate without effecting the temperature of the stored product.

It will be appreciated that the present invention provides a unique facility for effecting the storage and/or conditioning of agricultural products. Moreover, the invention contemplates a combined chilling and conditioning process whereby agricultural products, with a normal storage life of only a few days, can be stored for long periods of time and selectively conditioned so that the resulting product has optimum market acceptability.

It will be further appreciated that the invention relies upon the aforedescribed unique correlation of wet- and dry-bulb temperatures and relative humidity conditions that are, in turn, properly related to the temperature and moisture content characteristics of the product so as to achieve such conditioning without risk of product spoilage and without affecting product quality. In this connection, the foregoing description of one preferred embodiment has included reference to specific air flow rate values, specific wet and dry bulb temperatures, and specific relative humidity values. It will be understood that these parameters are merely illustrative of one preferred mode of operation for the system and may or may not be applicable to the treatment of a specific product having characteristics substantially dissimilar to those of shelled corn and/or to the operation of the system in a geographical location subjected to rather unusual weather conditions.

In any event, by maintaining the desired correlation between the wet and dry bulb temperatures and the relative humidity of the air flow supplied to the enclosure, the aforedescribed desirable results can be achieved by the present invention even under these more unusual circumstances. In this latter connection, it should be understood that the system of the present invention can be operated so as to introduce moisture to a product confined within the enclosure when circumstances so dictate. Such introduction of moisture to the product can be effected when operating the system either on an open cycle or closed cycle basis. Moreover, when ambient conditions dictate, it may be necessary to introduce moisture to the conditioning air flow so that the system of the present invention also contemplates the use, when necessary, of means for providing moisture to the air flow prior to its introduction to the distributing network.

While various modifications in the disclosed embodiment might be devised by those skilled in the art (e.g. either by way of substituting various other commercially available system components for those previously described and/or by modifying phases of the overall process to complement the characteristics of a particular agricultural product), such variations would not constitute a departure from the invention, various features of which are set forth in the accompanying claims.

What is claimed is:

1. A system for effecting the storage and conditioning of agricultural products; which system comprises a support base; means defining a dome-like enclosure on said support base for accommodating the inloading of a substantial quantity of product such that said product is distributed over a wide base area at a relatively shallow depth; said enclosure defining means forming a continuous vapor barrier that surrounds said inloaded product; means defining an air flow distribution path throughout said support base; transducer means for generating an air flow supply having preselected temperature and relative humidity characteristics; and means connecting said transducer means to said defined air flow distribution path; said transducer means including a first control means for effecting the distribution of a substantially saturated, chilling air flow to and through said inloaded product so as to create a substantially uniform keeping temperature throughout said product, said transducer means also including a second control means for effecting the distribution of an only partially saturated air flow to and through said inloaded product, said second control means operating said transducer means independent of said first control means but effecting the production of said partially saturated air flow at a temperature related to the keeping temperature of the product.

2. A system in accordance with claim 1 wherein said transducer means includes a heat pump, a heat exchanger, and a plurality of temperature responsive sensing elements which are connected in thermal circuit to yield a controlled substantially saturated chilling air flow and a controlled only partially saturated air flow having temperature and relative humidity characteristics that are directly related to the keeping temperature of the product so that drying of the product is achieved as a result of the passage of the partially saturated air flow therethrough and the product temperature is maintained substantially at the previously established keeping temperature during such drying.

3. A system in accordance with claim 1 wherein said air flow distribution path defining means includes a plurality of joined and concentrically arranged screenlike ducting elements that are supported and located within a pervious base layer on which the product is supported and through which the air flow generated by said transducer means is distributed to effect substantially uniform passage of said air flow through said product.

4. A process for treating agricultural products which comprises maintaining a relatively high moisture content product in a confined enclosure, uniformly distributing a substantially saturated chilling air flow through the product to establish a selected keeping temperature at which the product can be stored for a prolonged period without spoilage, and uniformly distributing a partially saturated air flow through the product to reduce the moisture content thereof, said partially saturated air flow having a temperature and relative humidity directly related to the keeping temperature of the product.

5. A process for treating relatively high moisture content agricultural products, which process comprises supplying said high moisture content product to a confining enclosure at a given inloading rate; uniformly supplying a substantially saturated chilling air flow to and through the inloaded product so as to effect a reduction in the temperature thereof to a selected keeping temperature at which the product can be stored for a prolonged period without spoilage; the wet bulb temperature of said chilling air flow being selected in accordance with the desired keeping temperature of the inloaded product and said chilling air flow being supplied to said product for an initial preselected period of time that is related both to the rate at which the product is inloaded to said enclosure and to the temperature and moisture content of said inloaded product; and subsequently uniformly distributing a partially saturated air flow through said product to reduce the moisture content thereof while maintaining the temperature of said product substantially at the preselected keeping temperature during said moisture removal period; said partially saturated air flow having a temperature and relative humidity directly related to the keeping temperature of the product and being supplied to said product for a period of time related both to the rate at which the reduction in the moisture content of the product is to be effected and to the total amount of moisture that is to be removed from the product.

6. A system for effecting the storage and conditioning of agricultural products; which system comprises a porous support base of substantial area; means defining a dome-like enclosure on said porous support base for accommodating the inloading of a substantial quantity of product; said enclosure defining means forming a continuous vapor barrier that surrounds said inloaded product; means for inloading said product and for effecting the substantially uniform distribuiton thereof over the entire support base at a relatively shallow depth; means defining a concentrically arranged multi-channel air flow distribution path throughout said porous support base; transducer means for selectively generating an air flow supply having preselected temperature and relative humidity characteristics; means connecting said transducer means to said multi-channel air flow distribution path; said transducer means including a first control means for effecting the distribution of a substantially saturated, chilling air flow to and through said inloaded product for an initial preselected period of time dictated both by the rate at which said product is inloaded to said enclosure and by the moisture content and temperature characteristics of the inloaded product; said substantially saturated, chilling air flow effecting a reduction in the temperature of said product to a substantially uniform keeping temperature that corresponds essentially to the wet bulb temperature of the chilling air flow; said transducer means also including a second control means for effecting the distribution of an only partially saturated air flow to and through said inloaded product so as to effect a reduction in the moisture content of said product; said partially saturated air flow being supplied to said product for a subsequent preselected period of time related both to the rate at which the reduction in the moisture content of the product is to be effected and to the amount of moisture that is to be removed from the product; said second control means operating said transducer means independent of said first control means but effecting the production of the partially saturated air flow at a temperature and with a relative humidity that is related to the keeping tempertaure of the product.

7. A system in accordance with claim 6 and including means for effecting the selective discharge of the product from said enclosure; said discharging means including a discharging receptacle formed in said porous support base and a discharging auger extending beneath said porous support base from said discharging receptacle to a location external of said enclosure.

8. A process in accordance with claim 4 wherein, during the period that a reduction in the moisture content of the product is effected by the distribution of a partially saturated air flow therethrough, a condition of equilibrium is established in that portion of the product from which the desired amount of moisture has been removed and the undried product is maintained substantially at the previously established keeping temperature, the temperature and relative humidity characteristics of said partially saturated air flow being preselected to insure the maintenance of the desired keeping temperature in the undried portion of the product and further insuring that the equilibrium condition established in the conditioned portion of the product conforms to the product quality desired.

9. A system for effecting the storage and conditioning of agricultural products, which system comprises a support base; means defining an enclosure on said support base for accommodating the inloading of a substantial quantity of product such that said product is distributed over a wide base area at a relatively shallow depth; said enclosure defining means forming a continuous vapor barrier that surrounds said inloaded product; means for providing air flow throughout said support base; transducer means for generating an air flow supply having preselected temperature and relative humidity characteristics; and means connecting said transducer means to said means for providing air flow; said transducer means including a first control means for effecting the distribution of a substantially saturated, chilling air flow to and through said inloaded product so as to create a substantially uniform keeping temperature throughout said product, said transducer means also including a second control means for effecting the distribution of an only partially saturated air flow to and through said inloaded product, said second control means operating said transducer means independent of said first control means but effecting the production of said partially saturated air flow at a temperature related to the keeping temperature of the product.

10. A system in accordance with claim 9 wherein said transducer means includes a heat pump, a heat exchanger, and a plurality of temperature responsive sensing elements which are connected in thermal circuit to yield a controlled substantially saturated chilling air flow and a controlled only partially saturated air flow having temperature and relative humidity characteristics that are directly related to the keeping temperature of the product so that drying of the product is achieved as a result of the passage of the partially saturated air flow therethrough and the product temperature is maintained substantially at the previously established keeping temperature during such drying.

11. A system for effecting the storage and conditioning of agricultural products, which system comprises a porous support base of substantial area; means defining an enclosure on said porous support base for accommodating the inloading of a substantial quantity of product, said enclosure defining means forming a continuous vapor barrier that surrounds said inloaded product; means for inloading said product and for effecting the substantially uniform distribution thereof over the entire support base at a relatively shallow depth; means for providing air flow throughout said porous support base; transducer means for selectively generating an air flow supply having preselected temperature and relative humidity characteristics; means connecting said transducer means to said means for providing air flow, said transducer means including a first control means for effecting the distribution of a substantially saturated, chilling air flow to and through said inloaded product for an initial preselected period of time dictated both by the rate at which said product is inloaded to said enclosure and by the moisture content and temperature characteristics of the inloaded product; said substantially saturated, chilling air flow effecting a reduction in the temperature of said product to a substantially uniform keeping temperature that corresponds essentially to the wet bulb temperature of the chilling air flow; said transducer means also including a second control means for effecting the distribution of an only partially saturated air flow to and through said inloaded product so as to effect a reduction in the moisture content of said product; said partially saturated air flow being supplied to said product for a subsequent preselected period of time related both to the rate at which the reduction in the moisture content of the product is to be effected and to the amount of moisture that is to be removed from the product; said second control means operating said transducer means independent of said first control means but effecting the production of the partially saturated air flow at a temperature and with a relative humidity that is related to the keeping temperature of the product.

12. A system in accordance with claim 11 and including means for effecting the selective discharge of the product from said enclosure; said discharging means including a discharging receptacle in said porous support base and a discharging auger extending beneath said porous support base from said discharging receptacle to a location external of said enclosure.

References Cited

UNITED STATES PATENTS

| 2,036,127 | 3/1936 | Edholm | 34—34 |
| 3,044,182 | 7/1962 | Steffen | 34—50 |
| 3,264,118 | 8/1966 | Kilcrease et al. | 99—153 |
| 2,027,268 | 1/1936 | Davis | 98—55 |

(Other references on following page)

UNITED STATES PATENTS

| | | | |
|---|---|---|---|
| 2,935,009 | 5/1960 | Cloud et al. | 98—54 |
| 3,129,071 | 4/1964 | Meredith | 98—54 XR |

FOREIGN PATENTS

| | | |
|---|---|---|
| 736,497 | 6/1943 | Germany. |
| 671,085 | 4/1952 | Great Britain. |

OTHER REFERENCES

"Grain Chilling and Drying as a Combined Operation," Farm Mechanization, October 1965.

Powell, "The Case for Chilled Grain Storage," Country Life, Aug. 4, 1966, pp. 293–4.

"Aerating Farm-Stored Grain," Circular 849, University of Illinois, April 1942.

ROBERT A. O'LEARY, *Primary Examiner.*

M. A. ANTONAKAS, *Assistant Examiner.*

U.S. Cl. X.R.

34—20, 66